United States Patent
Yoo et al.

(10) Patent No.: US 11,354,724 B1
(45) Date of Patent: Jun. 7, 2022

(54) METHOD, SYSTEM, AND MEDIUM FOR FULFILLING IN-APPLICATION PRODUCT REDEMPTION REQUESTS FROM ONLINE SELLERS

(71) Applicant: SquareTwo, Inc., San Francisco, CA (US)

(72) Inventors: David Yoo, San Francisco, CA (US); Benjamin Sai Yee, San Francisco, CA (US)

(73) Assignee: SquareTwo, Inc., San Francisco, CA (US)

( * ) Notice: Subject to any disclaimer, the term of this patent is extended or adjusted under 35 U.S.C. 154(b) by 404 days.

(21) Appl. No.: 16/258,243

(22) Filed: Jan. 25, 2019

(51) Int. Cl.
- *G06Q 30/06* (2012.01)
- *G06F 9/54* (2006.01)
- *G06Q 30/02* (2012.01)
- *G06F 16/953* (2019.01)

(52) U.S. Cl.
CPC .......... *G06Q 30/0633* (2013.01); *G06F 9/547* (2013.01); *G06F 16/953* (2019.01); *G06Q 30/0222* (2013.01)

(58) Field of Classification Search
CPC ............ G06Q 30/0633; G06Q 30/0222; G06F 16/953; G06F 9/547
See application file for complete search history.

(56) References Cited

U.S. PATENT DOCUMENTS

| | | | | |
|---|---|---|---|---|
| 2011/0225418 | A1* | 9/2011 | Shipley | G06F 21/62 713/153 |
| 2013/0159087 | A1* | 6/2013 | Boyd | G06Q 30/0226 705/14.33 |
| 2014/0280919 | A1* | 9/2014 | Lakes | H04L 67/2814 709/224 |
| 2020/0192706 | A1* | 6/2020 | Huus | G06F 9/505 |

FOREIGN PATENT DOCUMENTS

WO WO-2017025939 A1 * 2/2017 ......... G06F 17/3048

OTHER PUBLICATIONS

Zawacki, Tim. 2017. "Synchrony Ups Rewards Game with New PayPal 2% Cash-Back Card." SNL Financial Services Daily: n/a. https://dialog.proquest.com/professional/docview/1934454680?accountid=131444. (Year: 2017).*

* cited by examiner

*Primary Examiner* — Matthew E Zimmerman
*Assistant Examiner* — Latasha D Ramphal
(74) *Attorney, Agent, or Firm* — Van Pelt, Yi & James LLP

(57) ABSTRACT

A method and system for fulfilling in-application product redemption requests is described. A fulfillment system receives a product search application programming interface (API) call from an application. The product search API includes a set of at least one product criterion received from an application. An aggregated catalog is searched based on the set of at least one product criterion. A set of product metadata is returned. The set of product metadata corre- (Continued)

sponds to at least one product that matches the set of at least one product criterion. A redemption API call that includes product information and a physical address is also received from the application. A fulfillment request is sent to an online retail platform separate from the fulfillment system via a fulfillment API call that includes the product information and the physical address for the online retail platform to deliver a corresponding product to the physical address.

20 Claims, 5 Drawing Sheets

METHOD, SYSTEM, AND MEDIUM FOR FULFILLING IN-APPLICATION PRODUCT REDEMPTION REQUESTS FROM ONLINE SELLERS

BACKGROUND OF THE INVENTION

Applications for mobile and other devices have become ubiquitous. In addition to including games, applications may also gamify routine chores, health-related activities and other tasks. Because they are pervasive, applications increasingly compete for users' attention and time. In order to attract and retain users, applications may offer rewards. The simplest rewards may be a graphic or sound in response to completing a task. Applications also award points. For example, points may be offered for exercise, using cognitive training apps and even refraining from using a mobile device. Application developers may desire to provide rewards outside of the context of the application. However, doing so may involve technical challenges and significant additional effort. Accordingly, a mechanism for application developers to provide rewards to users outside of the application is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for fulfilling in-application product redemption requests are described. A product search application programming interface (API) call that includes a set of at least one product criterion is received from an application at a fulfillment system. An aggregated catalog is searched based on the set of product criteria. A set of product metadata is returned. The set of product metadata corresponds to at least one product that matches the set of product criteria. A redemption API call that includes product information and a physical address is also received from the application. A fulfillment request is sent to an online retail platform separate from the fulfillment system via a fulfillment API call. The fulfillment API call includes the product information and the physical address for the online retail platform to deliver a corresponding product to the physical address.

Figure 1:
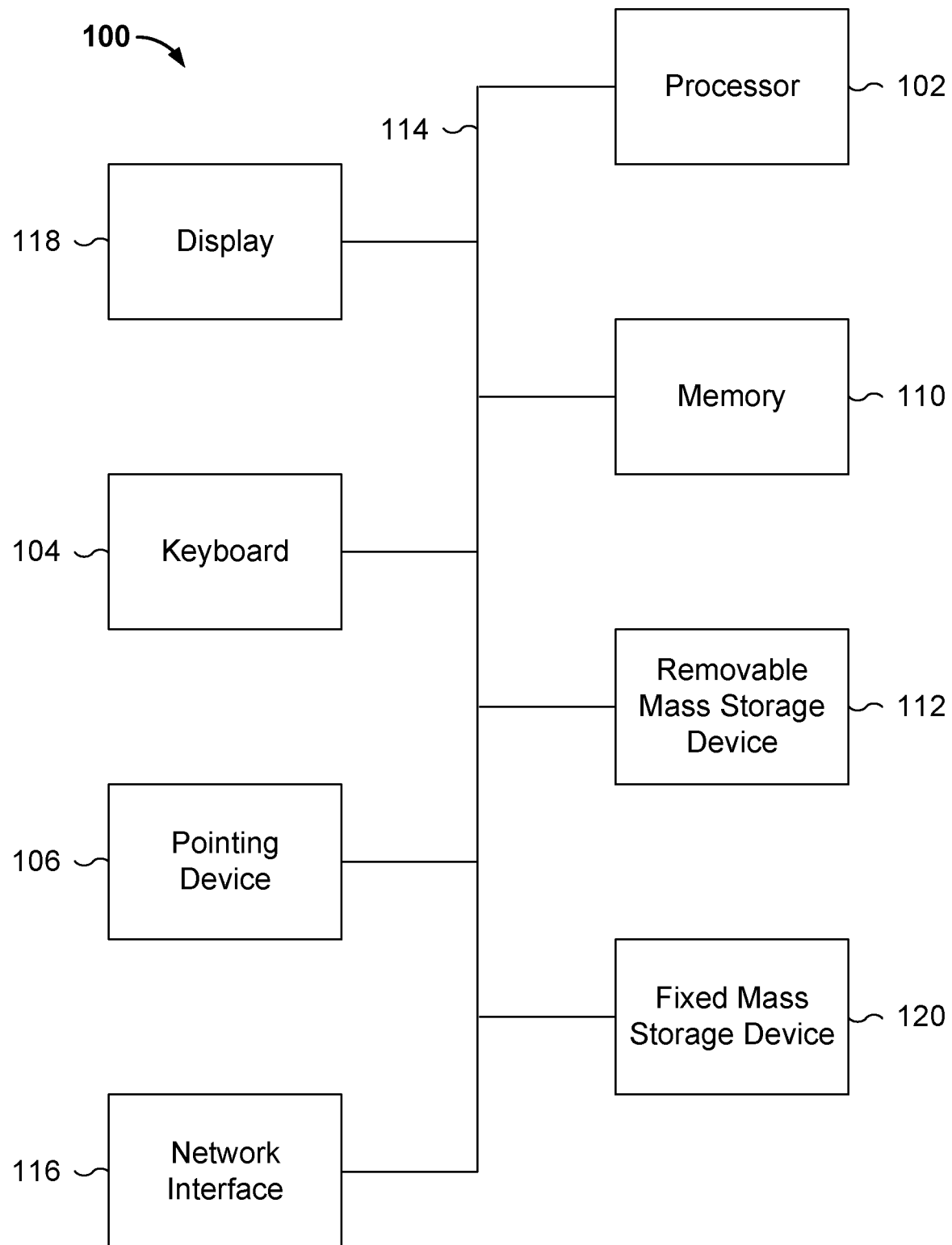
FIG. 1 is a functional diagram illustrating a programmed computer system for providing in-application redemption requests.

FIG. 1 is a functional diagram illustrating a programmed computer system usable in a system for fulfilling in-application redemption requests in accordance with some embodiments. As will be apparent, other computer system architectures and configurations can be used to manage a web application firewall. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Although described as a single processor, processor 102 may include multiple processors. Using instructions retrieved from memory 110, the processor 102 controls the reception and manipulation of input data, and the output and display of data on output devices (e.g., display 118). In some embodiments, processor 102 includes and/or is used to provide functions described below with respect to system 200, etc. of FIG. 2 and methods 300, 315, 320, 350 and 370.

Processor 102 is coupled bi-directionally with memory 110, which can include a first primary storage, typically a random access memory (RAM), and a second primary storage area, typically a read-only memory (ROM). Primary storage can be used as a general storage area and as scratch-pad memory, and can also be used to store input data and processed data. Primary storage can also store programming instructions and data, in the form of data objects and text objects, in addition to other data and instructions for processes operating on processor 102. Primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
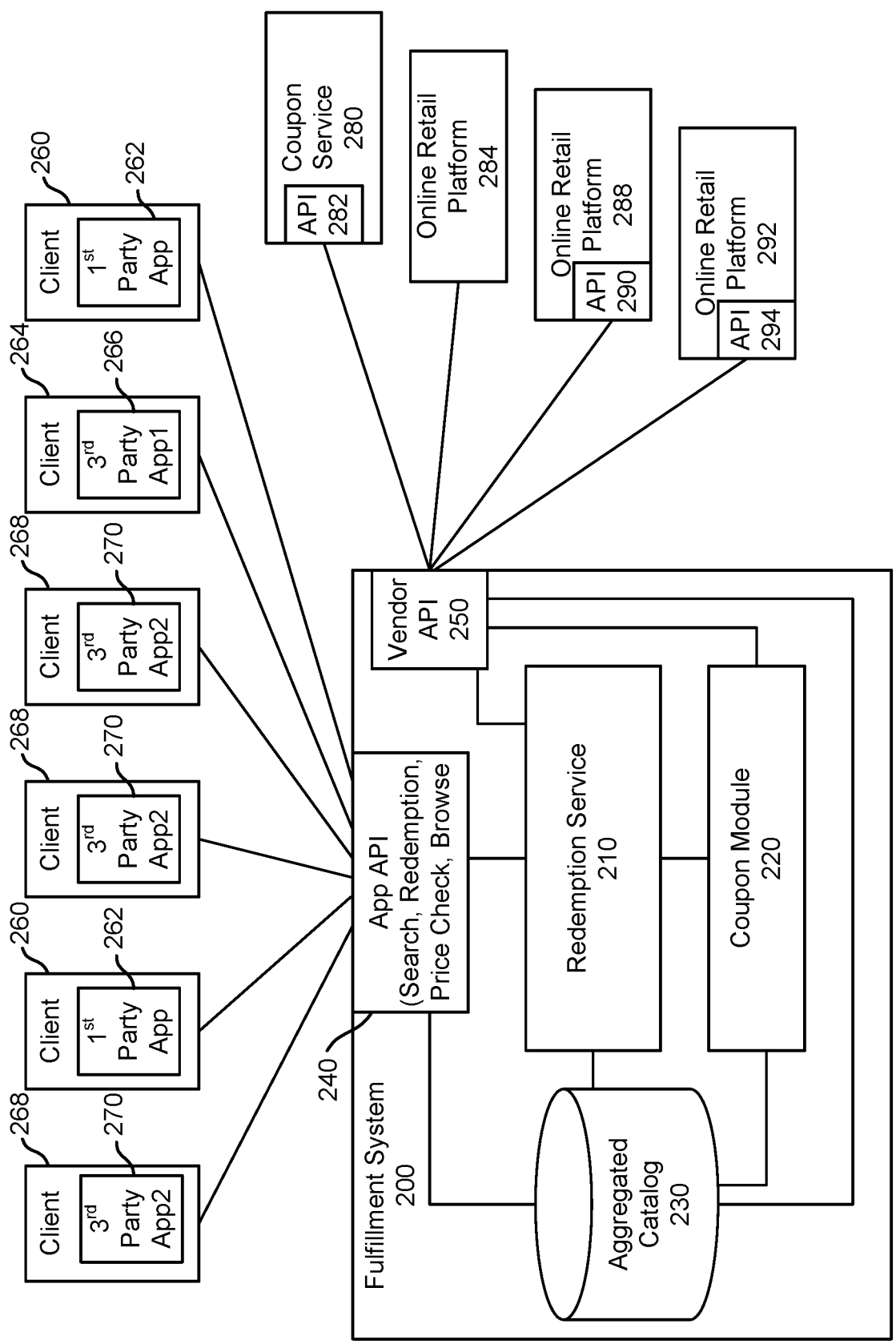
FIG. 2 is a block diagram illustrating an embodiment of a system for managing and fulfilling in-application redemption requests.

FIG. 2 is a block diagram illustrating an embodiment of a fulfillment system 200 for managing and fulfilling in-application redemption requests. Fulfillment system 200 is shown in the context of client devices 260, 264 and 268, coupon service 280 and vendors 284, 288 and 292. However, system 200 may be used with additional and/or other client devices, coupon services and/or vendors. A client device can be a laptop computer, a desktop computer, a tablet, a mobile device, a smart phone, a wearable networking device, or any other appropriate computing device. In this example, client devices such as 260 and vendors such as 280 connect to fulfillment system 200 via one or more networks (not explicitly shown). The networks include the Internet, a private network, a hybrid network, or any other communications network.

Clients 260, 264 and 268 run applications 262, 266 and 270. First-party applications 262 are provided to clients 260 by managers of fulfillment system 200. Third-party applications 266 and 270 are developed and provided by other entities but are authorized to use fulfillment system 200. Online retail platforms 284, 288 and 292 correspond to online retailers, at least some of which can be accessed separately by users of clients 260, 264 and 268. Online retail platforms 284, 288 and 292 are, therefore, not associated with fulfillment system 200. Coupon service 280 provides electronic coupons or other techniques for receiving discounts on items from online retail platforms 284, 288 and 292. In some embodiments, coupon service 280 is accessible to the public, for example via the Internet. In other embodiments, use of coupon service 280 may be limited to fulfillment system 200 and/or online retail platforms 280, 288 and 292. Thus, coupon service 280 is typically associated with an entity other than online retail platforms 284, 288 and 292. For example, online retail platforms 284, 288 and 292 might include Amazon®, Walmart® and eBay®. Coupon service 280 may be a service provided by a manufacturer of products sold on online retail platforms 284, 288 and 292; a publicly available discount service such as GROUPON® or other analogous service.

Applications 262, 266 and 270 have internal scoring mechanisms for rewarding users. The scoring mechanism described herein for applications 262, 266 and 270 is points. In other embodiments, the scoring mechanisms may be different. For example, tickets, indicators of milestone completion, badges, in-application currency and/or other scoring techniques may be used for applications 262, 266 and 270. For example, application 262 may be a game in which users can accrue tickets. Application 266 may be a lifestyle application in which users earn merit badges for completed tasks such as exercising a certain amount per day. These mechanisms are essentially methods for scoring progress that can be considered to correspond to points. Applications 262, 266 and 270 define the conversion rate between the points and the actual currency used by online retail platforms 284, 288 and 292. For example, for vendor 284 and application 262, the conversion rate may be between points and dollars. In some embodiments, the conversion rate is determined per application to provide a gross margin for each application 262, 266 and/or 270. For third party applications 270, a setup fee, a regular maintenance fee, per transaction fees and/or other fees or costs may be charged separately by maker of fulfillment system 100 or accounted for in the conversion rate.

Fulfillment system 200 includes one or more servers configured to service in-application redemption requests. A physical server has hardware components and software components, and can be implemented using a device such as 100. Fulfillment system 200 includes redemption service 210 and coupon module 220 that are instantiated on physical servers, aggregated redemption catalog 230 and vendor application programming interface (API) 250 and application API 240. Although shown separately, application API 240 and vendor API 250 may be part of a single API provided for interfacing with clients 260, 264 and 268, coupon service 280 and vendors 284, 288 and 292.

Coupon module 220 manages communication with coupon service 280 and provides metadata related to discounts to aggregated catalog 230. Coupon module 220 queries coupon service 280 via vendor API calls 250 to obtain discounts for products represented in aggregated catalog 230. If products in aggregated catalog 230 are redeemed, coupon service 280 provides the appropriate metadata to redemption services 210 for obtaining the corresponding discount.

Aggregated catalog 230 includes metadata for products aggregated from multiple online retail platforms 284, 288 and 292. The metadata in aggregated catalog 230 is for selected items from online retail platforms 284, 288 and 292 and is organized, for example, based on product categories and/or price. In some embodiments, only a subset of the products available on venders 284, 288 and 292 is represented in aggregated catalog 230. In other embodiments, all of the items from one or more vendors 284, 288 and 292 are present in aggregated catalog 230. In some embodiments, aggregated catalog 230 may include the same item from multiple vendors 284, 288 and/or 292. In other embodiments, each product is from a single vendor 284, 288 or 292. The metadata may include product images, a product description, a URL for the product for online retail platforms 284, 288 and/or 292, the quantity of the product available, any time limits on availability and other descriptive information. Also included in the metadata are the requisite number of points needed to be redeemed to obtain the product, any discounts applicable and, in some instances, a corresponding actual price in real-world currency for the online retail platforms 284, 288 and/or 292 that stock the product. Thus, the requisite number of points is the actual price of the product converted to points. In some embodiment, the requisite number of points may include shipping costs, which are also converted from actual costs to points. Further, the requisite number of points may be reduced by any discounts available through coupon service 280. A user of application 262, 266 or 270 may access and browse aggregated catalog 230. Aggregated catalog 230 is also searchable based on product criteria, such as in-application price, product description, online retail platforms carrying the product and/or other criteria. An example of the conversion is explained below.

Suppose a mobile phone case is a product available at online retail platforms 288 and 292. The actual price for online retail platform 288 is $10, a discount of 10% is available through coupon service 280 and shipping is $2.50. The actual price for the same mobile phone case at online retail platform 292 is $11 but shipping is free. Also, suppose that the conversion factor for application 262 is 1,000 points per dollar, while the conversion factor for application 266 is 1,500 points per dollar. Also suppose that application 262 is configured such that shipping and discounts are separately included in aggregated catalog 230, while application 266 is configured such that shipping and discounts are included in the requisite number of points only. For application 262, aggregated catalog 230 will apply the conversion factor to the actual price for online retail platform 288 for: $10×1,000 points/dollar=10,000 points for the product; $10×0.1 discount×1,000 points/dollar=1,000 points in discount; and $2.50 shipping×1,000 points/dollar=2,500 points in shipping. The requisite number of points is also calculated as: 10,000−1000+2500=11,500 points. For online retail platform 292, aggregated catalog 230 applies the conversion factor to the actual price for: $11×1,000 points/dollar=11,000 points. Thus, for application 262, aggregated catalog 230 includes the information in Table I. In addition to the information shown, image(s) of the item, product descriptions or other information may be included in the view of the aggregated catalog presented to the user.

TABLE I

|  | Mobile Phone Case Platform 288 | Mobile Phone Case Platform 292 |
| --- | --- | --- |
| Product Points | 10,000 | 11,000 |
| Discount | (1,000) |  |
| Shipping | 2500 |  |
| Requisite No. of Points | 11,500 | 11,000 |

For application 266, aggregated catalog 230 will apply the conversion factor to the actual price for online retail platform 288 for: $10×1,500 points/dollar=15,000 points for the product; $10×0.1 discount×1,500 points/dollar=1,500 points in discount; and $2.50 shipping×1,500 points/dollar=3,750 points in shipping. The requisite number of points is determined to be: 15,000−1500+3750=17,250. For online retail platform 292, aggregated catalog 230 applies the conversion factor to the actual price for: $11×1,500 points/dollar=16,500 points. Thus, for application 262, aggregated catalog 230 indicates the information in Table II.

TABLE II

|  | Mobile Phone Case Platform 288 | Mobile Phone Case Platform 292 |
| --- | --- | --- |
| Requisite No. of Points | 17,250 | 16,500 |

In some embodiments, aggregated catalog 230 only indicates the lowest price product. In the example above, the mobile phone case available from online retail platform 292 would only be included.

In some embodiments, aggregated catalog 230 may present a variety of products from one or more online retail platforms, 284, 288 and/or 292. The products may be organized by category (e.g. jewelry, mobile device accessories), by number of points required to redeem the item, or in another manner. For example, Table III indicates another manner of presenting information related to products that can be obtained by redeeming points. Although text is shown in Table III, images might be provided in addition to or in lieu of a text description.

TABLE III

| Available for 10,000 Points | Available for 11,000 Points | Available for 12,000 Points |
|---|---|---|
| Phone Case 1, Platform 288 | Jewelry Item 2, Platform 292 | Jewelry Item 2, Platform 288 |
| Phone Case 2, Platform 292 | Jewelry Item 2, Platform 288 | Mobile Accessory 1, Platform 292 |
| Jewelry Item 1, Platform 284 | Fashion Item 1, Platform 288 | |

Redemption service 210 manages redemption of products in aggregated catalog 230 using points. Redemption service 210 thus communicates with applications 262, 266 and 270 via application API 240 to obtain information for purchasing products selected from aggregated catalog 230. Redemption service 210 also communicates with vendors 284, 288 and 292 to order the products and have the product delivered to the physical addresses provided by users of applications 262, 266 and 270.

Application API 240 and vendor API 250 allow first-party application 262 and third-party applications 266 and 270 to take advantage of fulfillment system 200. Applications 262, 266 and 270 may have different makers, be compatible with different platforms and have little in common. However, applications 262, 266 and 270 make API calls compatible with application API 240. In some embodiments, calls to the APIs 240 and 250 use HTTP protocols and JSON data format. In some embodiments, a specific set of client API libraries are provided by the same developer that provides Application API 240. The client API libraries are compatible with application API 240 and are implemented by applications 262, 266 and 270. Applications 262, 266 and 270 may have unique identifying tokens for each client 260, 264 and 268. Using the tokens, applications 262, 266 and 270 can be authorized to use fulfillment system 200 via app API 240. By utilizing API calls having the appropriate format and providing the conversion rate between points and actual currency, identify of the vendors 284, 288 or 292 from which the product is desired, and identifier for the product, disparate applications 262, 266 and 270 can employ fulfillment system 200 to obtain products from vendors 284, 288 and 292 using points. Consequently, developers of applications 262, 266 and 270 need not expend resources to determine how to communicate with disparate online retail platforms 284, 288 and 292. Moreover, applications 262, 266 and 270 may avoid complexities within applications 262, 266 and 270 that may result in latencies or other issues with performance of applications 262, 266 and 270 on clients 260, 264 and 268. Fulfillment system 200 is also scalable. Thus, the addition of online retailers and applications may be facilitated.

Figure 3:
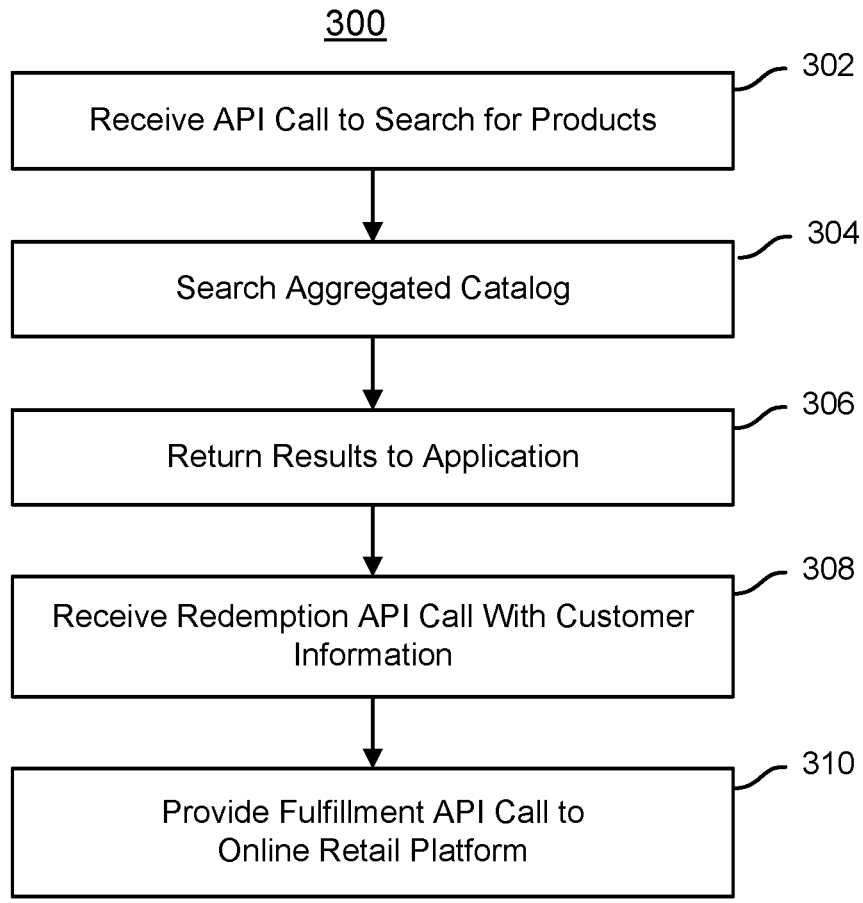
FIG. 3 is a flow chart depicting an embodiment of a method for managing and fulfilling in-application redemption requests.

FIG. 3 is a flow chart depicting an embodiment of method 300 for managing and fulfilling in-application redemption requests. Method 300 may be performed using processor(s) 102 executing instructions from memory 110. Method 300 is described in the context of fulfillment system 200 of FIG. 2 in this example. In other embodiments, other and/or additional components may be used to perform method 300 and method 300 may be used in conjunction with other fulfillment systems. Method 300 is described in the context of a single application and a single client. However, the method 300 is intended to be used with multiple clients running multiple applications.

Fulfillment system 200 receives, via application API 240, a product search API call from an application 262, 266 or 270 requesting a search of aggregated catalog 230 for product(s), at 302. A product search API call includes a set of search criteria. The search criteria can include but are not limited to key words describing the product(s), product identification number(s) such as SKU(s) or vendor specific identification numbers, a minimum or maximum price in points for the application 262, 266 or 270 or actual currency, limitations on online retail platforms desired to be used and/or other criteria.

Aggregated catalog 230 is searched using the search criteria provided, at 304. Results for the product search API call are returned to the application 262, 266 or 270, at 306. The results include metadata related to the products that match the search criteria. For example, the metadata may include one or more of an image of the product(s), the URL(s) for the product(s) at the manufacturer or corresponding online retail platform 284, 288 and/or 292, the in-application price(s), discounts, time limits for receiving the discounts, time limits for receiving the product(s), limitations on quantity of the product(s) and the vendor(s) from which the product can be obtained. In some embodiments, the metadata is returned in a JSON array. Thus, a user of application 262, 266 or 270 can be provided with information for deciding whether they wish to obtain the product.

If the user decides to redeem points for the product(s), the user requests redemption in the application 262, 266 or 270. Consequently, fulfillment system 200 receives at application API 240 a redemption API call from application 262, 266 or 270, at 308. The redemption API call includes information for the product(s) desired to be redeemed and one or more physical addresses for delivery of the product(s). For example, the product SKU and physical address of the user may be included in the redemption API call. In some embodiments, the physical address is included with the initial redemption API call. In other embodiments, fulfillment system 200 returns an order form for the user to complete in response to the initial redemption API call. The user then provides information such as the physical address for delivery and product identification number on the order form. In either case, however, communication between fulfillment system 200 and application 262, 266 or 270 is via application API 240 and is considered to be via a redemption API call. The identity of the user, discounts, memberships with online retail platforms or other information might also be included in the order form or initial redemption API call.

In some embodiments, at least part of the redemption API call is encrypted. For example, the physical address and/or user's/recipient's identity may be encrypted using, for example, transport layer security (TLS). Encryption is used in order to protect the confidentiality of the user's/recipient's personal information. If stored by fulfillment system 200, the identity and physical address may remain encrypted. In some embodiments, secure socket layer (SSL) certificates are used for security. However, at least the physical address and, in some embodiments, the identity of the user/recipient are decrypted for ordering. The number of points available for redeeming products is also provided as part of the redemption API at 308, retained from the product search API or saved from other communication between fulfillment system 200 and application 262, 266 or 270. Consequently, redemption service 210 can determine whether a sufficient number of points is available for redeeming the selected product(s).

Redemption service 210 sends a fulfillment request to an online retail platform via a fulfillment API call from vendor API 250, at 310. The fulfillment API call includes the product information and the physical address to which the online retailer is to deliver the selected product. In order to make the fulfillment API call, redemption service 210 decrypts the redemption API call if required. In addition, any discounts available may be obtained from coupon service 280 or from a search of aggregated catalog 230. For example, a fulfillment API call may be made to API 290 or 294 of online retail platforms 288 or 292, respectively. For an online retail platform without an API, such as vendor 284, vendor API 250 provides a suitable set of queries and responses in lieu of APIs. Redemption service 210 also manages payment to online retail platform 284, 288 or 292. For example, as part of a fulfillment API call, in a separate payment API, or via other communications, redemption service 210 may authorize debiting of an account for fulfillment system 200. If payment is made for product(s) redeemed in third-party application 266 or 270, then redemption service 210 may manage billing or otherwise obtain payment from makers of third-party application 266 or 270 after payment by fulfillment service 200. In some embodiments, redemption service 210 may communicate with a payment system(s) for makers of third-party applications 266 and 270 such that makers of third-party applications 266 and 270 pay online retail platforms 284, 288 and 292 directly. Other mechanisms for ensuring payment to online retail platforms 284, 288 and 292 are made may be used in other embodiments. Redemption service 210 thus manages tasks for completion of the order(s) for product(s) being redeemed.

Once the order is completed, redemption service 210 may return a result to the application 262, 266 or 270 indicating that the order has been completed and requiring that the appropriate amount of points be debited. In some embodiments, redemption service 210 also tracks progress of the orders and may provide, via application API 240, notifications of shipping and delivery. For example, in response to a progress API call from application 262, 266 or 260, redemption service 210 may query the appropriate online retailer(s) 284, 288 and/or 292 to determine whether the product(s) have been shipped or delivered and return results indicating whether the item has been shipped or delivered.

For example, a user of client 260 may accrue points on application 262 by playing a game or performing other tasks having point values. Suppose the user has accrued 20,000 points and would now like to redeem the points. Using application 262, the user requests a search for products, which sends an API call to fulfillment system 200 at 302. In the mobile phone case example above, the user may be looking for mobile phone cases. Thus, particular search criteria for mobile phone cases, such as the desired color, make/model of the user's phone and maximum price may be part of the API call. Aggregated catalog 230 is searched at 304 and results returned to application 262 at 306. The results shown in Table I may be returned to application 262. Analogous information for other mobile phone cases meeting the search criteria may also be returned at 306. In some embodiments, mobile phone cases having a requisite number of points greater than 20,000 (the number of points the user has available) may not be returned. In other embodiments, such results are returned to give the user the option of waiting to redeem points. Suppose the user opts to redeem 11,000 points for the mobile phone case from online retail platform 292. The user selects this product in application 262. As a result, a redemption API call is provided from client 260 to fulfillment system 200 and received by fulfillment system 200 at 308. If not previously provided, redemption service 210 may return an order form to application 262 to allow the user to enter their physical address and product identification for the mobile phone case. Once the information for the order is received, redemption service 210 provides a fulfillment API call to online retail platform 292 including the physical delivery address. Payment to online retail platform 292 is also provided in actual currency, for example via a third party payment system or via an account at online retail platform 292 for fulfillment system 200. In some embodiments, managers of fulfillment system 200 may have a credit with online retail platform(s) 284, 288 and/or 292 or may be invoiced for products redeemed via fulfillment system 200. For third party applications 270, the third party may be invoiced by fulfillment system 200 or have an account with fulfillment system 200 or retail platforms 284, 288 and 290 that can be debited to pay for the products being redeemed. The requisite number of points (11,000 in this case) is also debited from the user's account at fulfillment system 200. Thus, the transaction is completed and the user of application 262 will receive the mobile phone case.

Using method 300, users of applications 262, 266 and 270 may receive physical goods in the real world in exchange for points. Thus, application developers are not limited to in-application or other electronic rewards for users. Developers may thus be better able to attract and retain users. In existing online fulfillment systems, products are not able to be retrieved directly through applications 262, 266 and 270. Instead, the user might receive an online credit at particular merchants which must be redeemed separately. As a result, the user may be driven away from applications 262, 266 and 270, which is undesirable. Further, developers of applications 262, 266 and 270 need not expend resources to determine how to communicate with disparate online retail platforms 284, 288 and 292 and manage transactions in order to allow users to receive products. In addition, developers of applications 262, 266 and 270 may avoid introducing complexities within applications 262, 266 and 270 relating to product redemption that may result in latencies or otherwise impair performance of applications 262, 266 and 270. For example, applications 262, 266 and 270 need not be capable of interfacing with any of the online retail platforms 284, 288 and 292 or with coupon service 280. Thus, development of applications 262, 266 and 270 is facilitated and performance of applications 262, 266 and 270 may be improved.

Figure 4:
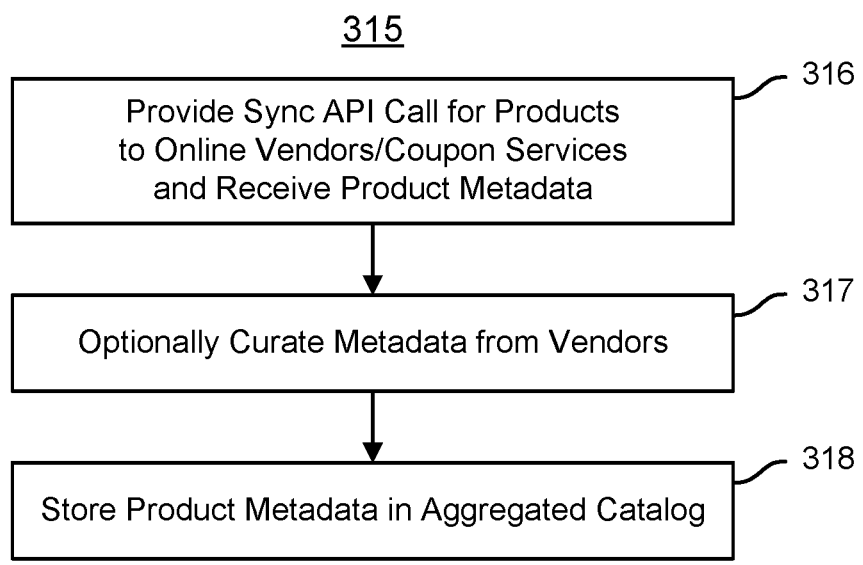
FIG. 4 is a flow chart depicting an embodiment of a method for managing products for in-application redemption requests.

FIG. 4 is a flow chart depicting an embodiment of a method 315 for managing products for in-application redemption requests. Method 315 may thus be used in preparing aggregated catalog 230 for use in method 300 and/or method 320, described below. Method 315 may be performed using processor(s) 102 executing instructions from memory 110. Method 315 is described in the context of fulfillment system 200. In other embodiments, other and/or additional components may be used to perform method 315. Method 315 may be used in conjunction with other fulfilment systems. Method 315 is described in the context of a single application and a single client. However, the method 315 is intended to be used with multiple clients running multiple applications.

Fulfillment system 200 provides a sync API call to online retail platforms 288 and 292, at 316. Also at 316, a synchronization (sync) call may be made to online coupon service 280 to determine any discounts. For vendor 284 which does not have an API, fulfillment system 200 otherwise manages a sync with online retail platform 284. Consequently, the metadata for the products provided by online retail platforms 284, 288 and 292 and metadata for discounts provided by coupon service 280 can be obtained. The metadata is optionally curated, at 317. For example, metadata for products not meeting particular criteria may be discarded. In some embodiments, the sync call at 316 only retrieves metadata for desired products. In other embodiments, metadata for more products is retrieved. This metadata may be removed at 317. In some embodiments, metadata for products that cost more than a price threshold, have fewer available than an obtainability threshold or are otherwise undesirable is removed. Also at 317, metadata may be organized by product category, price or otherwise put in a form usable by aggregated catalog 230. In addition, changes in the actual price for the products are converted to a change in the requisite number of points at 317. Any discounts for the products are converted to a reduction in the in-application price at 317. The metadata are stored by aggregated catalog 230, at 318.

Using method 315, the products available via fulfillment system 200 and the requisite number of points for the products are kept updated by fulfillment system 200. In existing online fulfillment systems, such quantities are not tracked and products are not able to be retrieved directly through applications 262, 266 and 270. Consequently, the users' redemption experience may be made more seamless. In the present implementation, applications 262, 266 and 270 need not track price, availability, discounts or other information about products redeemable using points. Applications 262, 266 and 270 need not utilize resources to communicate with multiple (or even one) online retail platforms 284, 288 and 292 to determine product availability, sync with coupon service 280 or convert actual prices to points. Consequently, latencies or performance issues between applications 262, 266 and 270 and firewalls for online retail platforms 284, 288 and 292 are avoided. Performance of applications 262, 266 and 270 are improved.

Figure 5:
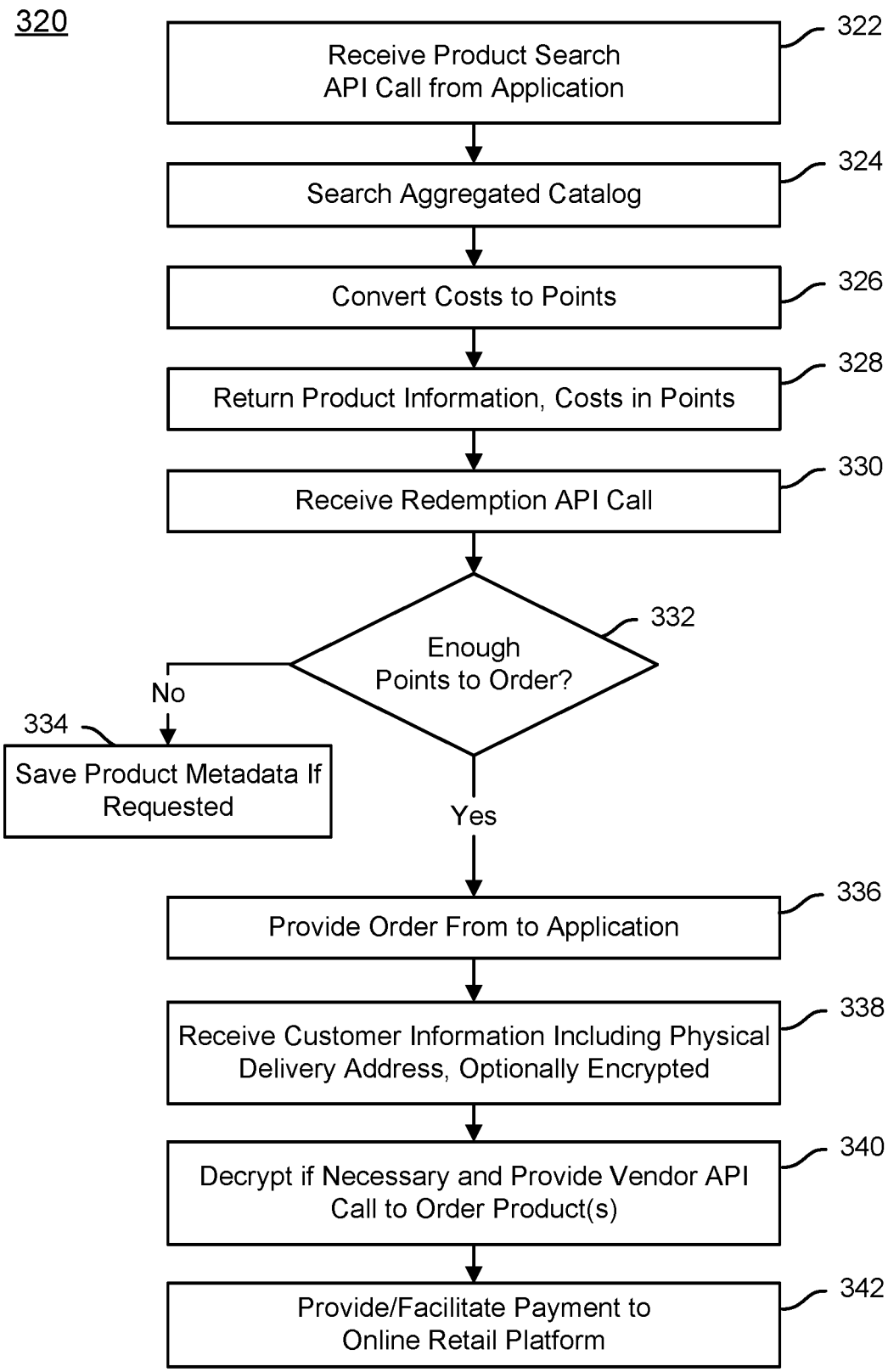
FIG. 5 is a flow chart depicting an embodiment of a method for managing and fulfilling in-application redemption requests.

FIG. 5 is a flow chart depicting an embodiment of method 320 for managing and fulfilling in-application redemption requests. Method 320 may be viewed as a particular implementation of method 300. Method 320 may be performed using processor(s) 102 executing instructions from memory 110. Method 320 is described in the context of fulfillment system 200. In other embodiments, other and/or additional components may be used to perform method 320. Method 320 may be used in conjunction with other fulfilment systems. Method 320 is described in the context of a single application and a single client. However, the method 320 can also be used with multiple clients running multiple applications.

Fulfillment system 200 receives, via application API 240, a product search API call from an application 262, 266 or 270, at 322. Thus, 322 is analogous to 302 described above with respect to method 300. A product search API call thus includes search criteria.

Aggregated catalog 230 is searched using the search criteria provided, at 324. For products matching the search criteria, the actual price is converted to the in-application price in points, at 326. Also at 326 any discounts may be converted to reductions in the in-application price. Any shipping costs are also converted into points at 326.

Results for the product search API call are returned to the application 262, 266 or 270, at 328. The results include metadata related to the products that match the search criteria, such as the product descriptions, the requisite number of points, the in-application discounts and the in-application shipping costs in points. For example, the metadata may include one or more of an image of the product(s) and the number of points required to be redeemed in order to receive the product. The number of points to ship the product and/or the reduction in number of points required due to discounts may be provided separately in some embodiments. Thus, a user of application 262, 266 or 270 can be provided with information for deciding whether they wish to obtain the product.

If the user decides to redeem points for the product(s), the user requests redemption in the application 262, 266 or 270. Consequently, fulfillment system 200 receives a redemption API call from application 262, 266 or 270, at 330. Thus, 330 is analogous to 308 of method 300. The redemption API call includes information for the product(s) desired to be redeemed and one or more physical addresses for delivery of the product(s). It is determined at 332 whether the user has sufficient points to be redeemed for the selected product. If not, the product metadata may be saved, for example in a wish list, at 334. This may include a return to the redemption API call indicating that insufficient points are available, offering the option of storing the product and/or returning the user to the search results.

An order form is returned to the application 262, 266 or 270 in response to the redemption API call and sufficient points being available, at 336. The physical address and other customer identification may be received at 338. Some or all of the identification information received at 338 may be encrypted in order to protect the personal information of the user/recipient of the product. If such information was included in the initial redemption API call, then 336 and 338 may be omitted.

If the physical address and other information were encrypted, then the information is decrypted and a vendor API call provided to order products, at 340. This may be achieved via a fulfillment API from vendor API 250. Such a fulfillment API is in the correct format for the corresponding API 290 or 294 of online retail platform 288 or 292. If the online retail platform does not have an API, such as online retail platform 284, then vendor API 250 provides a suitable set of queries and responses in lieu of API calls.

Payment to the vendor is managed to complete the order, at 342. For example, payment may be made directly from fulfillment system 200, from a third-party payment system or in another manner.

Using method 320 users of applications 262, 266 and 270 may receive physical goods in the real world in exchange for points. Thus, applications 262, 266 and 270 may be more attractive to users. Further, developers of applications 262, 266 and 270 need not expend resources to determine how to communicate with disparate online retail platforms 284, 288 and 292 and manage transaction. In addition, applications 262, 266 and 270 may avoid having complexities relating to product redemption that may result in latencies or otherwise impair performance.

Figure 6:
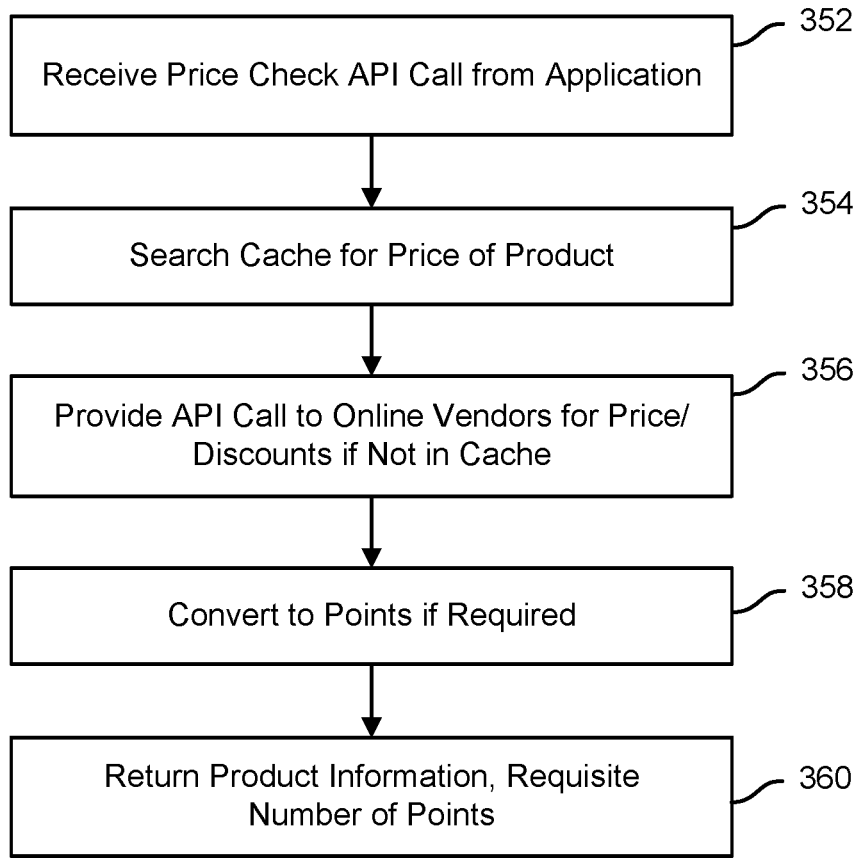
FIG. 6 is a flow chart depicting an embodiment of a method for checking prices for in-application redemption requests.

FIG. 6 is a flow chart depicting an embodiment of method 350 for checking prices for in-application redemption requests. Method 350 may be performed using processor(s) 102 executing instructions from memory 110. Method 350 is described in the context of fulfillment system 200. In other embodiments, other and/or additional components may be used to perform method 350. Method 350 may be used in conjunction with other fulfilment systems. Method 350 is described in the context of a single application and a single client. However, the method 350 is intended to be used with multiple clients running multiple applications.

A price check API call is received by fulfillment system 200, at 352. The price check API call checks for a product price of a particular product. Thus, the price check API call includes an identification of the product. In response, a cache for aggregated catalog 230 is searched, at 354. At 354, it is determined whether price metadata for the product is stored in the cache. In some embodiments, it is determined whether discount metadata and/or shipping cost metadata is in the cache. Metadata included in the cache is not older than the last sync for aggregated catalog 230, as discussed for method 315. If price metadata was received more recently, for example because of a redemption API call for the product or another price check API call for the product, then the cache may include this data. This price metadata may have been based on a request from the same client, from a different client using the same application or a different client using a different application. In some embodiments, the cache may be refreshed more frequently for products that are popular, have limited quantities or an actual price at online retail platforms 284, 288 or 292 that changes frequently.

If the price of the product is not found in the cache, then a price API call is provided via vendor API 250 to online vendors 288 and 292, at 356. In some embodiments, the price API call also requests the shipping costs. Also at 356 a discount API call may be provided to coupon service 280 in order to determine any discounts available. Vendors 288 and 292 return the actual price. Coupon service 280 returns metadata for any discounts and limitations thereon such as for deadlines and quantity. For vendor 284 not having an API, the price may be obtained in another manner. The actual price obtained either from the cache or from the online retail platform 284, 288 and/or 292 is converted to points if required, at 358. Also at 358 the actual discount and shipping costs are converted to an in-application reduction in points required for redemption and in-application points for shipping, if required. If the price, discount or shipping cost has not changed from previously stored data, then a conversion may not be performed at 358. The requisite number of points, shipping cost in points and discounts are returned, at 360. The information returned is from the cache, if available, or from the return to the price API call at 306. In some embodiments, the actual price, actual discount and/or actual shipping costs may also be returned.

Using method 350, users of applications 262, 266 and 270 may obtain the price of desired items. Because a cache search is performed at 354, repeated calls to online retail platforms 284, 288 and 292 and/or coupon service 280 may be avoided. Thus, entities 280, 284, 288 and 292 may be less likely to block fulfillment system 200. The round trip latency between fulfillment system 200 and applications entities 280, 284, 288 and 292 may also be avoided for metadata found in the cache. Consequently, performance of fulfillment system 200 may be improved.

Figure 7:
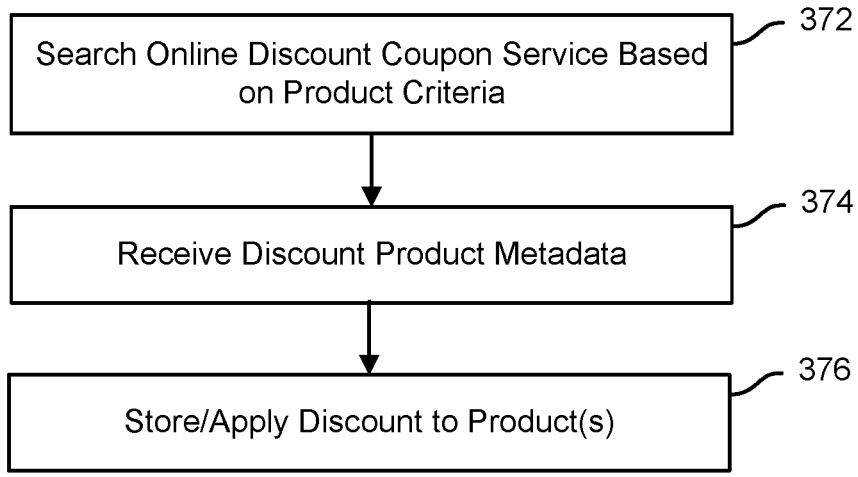
FIG. 7 is a flow chart depicting an embodiment of a method for obtaining discounts for products for in-application redemption requests.

FIG. 7 is a flow chart depicting an embodiment of method 370 for obtaining discounts for products for in-application redemption requests. Method 370 is thus used to update aggregated catalog 230 and may be used in method 300 and/or 320 to check discounts on the fly. Method 370 may be performed using processor(s) 102 executing instructions from memory 110. Method 370 is described in the context of fulfillment system 200. In other embodiments, other and/or additional components may be used to perform method 370. Method 370 may be used in conjunction with other fulfilment systems. Method 370 is described in the context of a single application and a single client. However, the method 360 can also be used with multiple clients running multiple applications.

Coupon service 280 is searched for discount codes based on product criteria, at 372. In some embodiments, 372 is performed as part of syncing aggregated catalog 230. Thus, categories of products or identification numbers for products having metadata in aggregated catalog 230 may be provided from fulfillment service 200 to coupon service 280 at 372. In some embodiments, 372 is performed as part of the redemption process. In such embodiments, the product criteria include the product identification number for the product selected for redemption. Thus, a cost reduction can be identified for the product being redeemed. In some embodiments, 372 is performed via a discount API call from vendor API 250 to API 282 of coupon service 280.

Discounted product metadata is received by fulfillment system 200, at 374. The discounted product metadata includes the cost reduction for the product(s) matching the criteria provided at 372. Limitations on the discount are also part of discounted product metadata. For example, the individual products for which the discount is available, deadlines for obtaining the discount, restrictions on the quantity and online retail platforms accepting the discount are included.

The discounted product metadata is applied to the products and/or stored, at 376. If method 370 is part of syncing aggregated catalog 230, then the discounted product metadata may be stored with the metadata for the corresponding products. The discounts may be converted to points. If method 370 occurs as part of a redemption process, then the discount may be applied to the product before payment is made to the appropriate online retail platform.

Using method 370 the discounts available to users of applications 262, 266 and 270 may be kept updated. Consequently, the users' redemption experience may be made more seamless. In addition, applications 262, 266 and 270 need not track discounts or other information about products redeemable using points. Consequently, latencies or issues between applications 262, 266 and 270 and coupon service 280 may be reduced or eliminated. Performance of applications 262, 266 and 270 may thus be improved.

Using the methods and system described herein, users of applications 262, 266 and 270 may redeem points won in the application for physical goods while using applications 262, 266 and 270. Application developers are not limited to offering in-application graphics or other electronic rewards for users. Consequently, applications may be more appealing to users. Further, users are not driven away from the application, for example to the online retail platform's site, to redeem points for physical goods. Instead, points can be redeemed for goods through the application. Developers of applications need not expend resources to determine how to communicate with disparate online retail platforms, understand how to communicate with coupon services and manage transactions in order to allow users to receive products within the applications. Thus, complexities relating to product redemption that may result in latencies or otherwise impair performance of applications need not be introduced. For example, applications need not regularly sync with online retail platforms or with coupon services. By caching price data for products and searching the cache before querying online retail platforms, fulfillment system 200 may further improve performance by reducing latencies and potentially preventing online retail platform firewalls from blocking access by fulfillment system 200. Thus, performance may again be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving at a fulfillment system a product search application programming interface (API) call from an application on a client device, the product search API call including a set of at least one product criterion;
searching in an aggregated catalog of the fulfillment system based on the set of at least one product criterion and returning a set of product metadata, the set of product metadata corresponding to at least one product that matches the set of at least one product criterion, the aggregated catalog including information for a plurality of products from a plurality of online retail platforms separate from the fulfillment system, a first portion of the information for the plurality of products being received by the fulfillment system from the plurality of online retail platforms in response to a synchronization between the fulfillment system and the plurality of online retail platforms, a second portion of the information for the plurality of products being in a cache of the fulfillment system and not older than a most recent synchronization, the set of the product metadata including a requisite number of points for each of the at least one product, the requisite number of points being computed based on an actual price and a conversion rate corresponding to the application, the conversion rate including at least one of a fulfillment system cost for the application and a user cost for the application;
caching, at the fulfillment system, the second portion of the information for the plurality of products in the cache, the searching including searching the cache before searching the plurality of online retail platforms;
receiving, at the fulfillment system from the application, a redemption API call that includes product information and a physical address; and
sending, from the fulfillment system, a fulfillment request to an online retail platform of the plurality of online retail platforms separate from the fulfillment system, via a fulfillment API call that includes the product information and the physical address for the online retail platform to deliver a corresponding product to the physical address without requiring the application to communicate directly with the online retail platform.

2. The method of claim 1, wherein the set of the product metadata includes at least one of a product image, a URL, and a product description.

3. The method of claim 1, wherein the set of the product metadata is specified as a JSON array.

4. The method of claim 1, wherein the application is among a plurality of applications.

5. The method of claim 4, wherein a portion of the plurality of applications is separate from the fulfillment system.

6. The method of claim 1, wherein the redemption API call is an encrypted redemption API call.

7. The method of claim 6, further comprising:
decrypting the encrypted redemption API call.

8. The method of claim 1, further comprising:
receiving a price check API call at the fulfillment system to check for the requisite number of points for a particular product.

9. The method of claim 8, further comprising:
determining whether at least one of the requisite number of points, a product price and the particular product is stored in the cache in response to the price check API call;
returning the at least one of the requisite number of points and the product price from the cache if the particular product is stored in the cache; and
querying at least one online retail platform of the plurality of online retail platforms for the product price if the at least one of the requisite number of points, the product price and the particular product is not stored in the cache.

10. The method of claim 1, further comprising:
providing a discount API call to an online coupon service, the discount API call including the set of the at least one product criterion to identify a point reduction for at least a portion of the at least one product; and
receiving a return of discounted product metadata, the discounted product metadata corresponding to the point reduction for the at least the portion of the at least one product.

11. A system for fulfilling in-application product redemption requests, comprising:
a processor configured to:
receive at a fulfillment system and from an application on a client device, a product search application programming interface (API) call that includes a set of at least one product criterion;
search in an aggregated catalog of the fulfillment system based on the set of at least one product criteria and returning a set of product metadata, the set of product metadata corresponding to at least one product that matches the set of at least one product criterion, the aggregated catalog including information for a plurality of products from a plurality of online retail platforms separate from the fulfillment system, a first portion of the information for the plurality of products being received by the fulfillment system from the plurality of online retail platforms in response to a synchronization between the fulfillment system and the plurality of online retail platforms, a second portion of the information for the plurality of products being in a cache of the fulfillment system and not older than a most recent synchronization, the set of the product metadata including a requisite number of points for each of the at least one product, the requisite number of points being computed based on an actual price and a conversion rate corresponding to the application, the conversion rate including at least one of a fulfillment system cost for the application and a user cost for the application;
cache, at the fulfillment system, the second portion of the information for the plurality of products in the cache, the processor being configured to search further including the processor being configured to search the cache before searching the plurality of online retail platforms;
receive, at the fulfillment system from the application, a redemption API call that includes product information and a physical address; and send, from the fulfillment system, a fulfillment request to an online retail platform of the plurality of online retail platforms separate from the fulfillment system via a fulfillment API call that includes the product information and the physical address for the online retail platform to deliver a corresponding product to the physical address without requiring the application to communicate directly with the online retail platform; and a memory coupled to the processor and configured to provide the processor with instructions.

12. The system of claim 11, wherein the set of the product metadata includes at least one of a product image, a URL, and/or a product description.

13. The system of claim 11, wherein the set of the product metadata is specified as a JSON array.

14. The system of claim 11, wherein the application is among a plurality of applications.

15. The system of claim 14, wherein a portion of the plurality of applications is separate from the fulfillment system.

16. The system of claim 11, wherein the redemption API call is an encrypted redemption API call and wherein the processor is further configured to decrypt the encrypted redemption API call.

17. The system of claim 11, wherein the processor is further configured to:

receive a price check API call at the fulfillment system to check for the requisite number of points for a particular product.

18. The system of claim 17, wherein the processor is further configured to:

determine whether at least one of the requisite number of points, a product price, and the particular product is stored in the cache in response to the price check API call;

return the at least one of the requisite number of points and the product price from the cache if the particular product is stored in the cache; and query at least one online retail platform of the plurality of online retail platforms for the product price if the at least one of the requisite number of points, the product price and the particular product is not stored in the cache.

19. The system of claim 11, wherein the processor is further configured to:

provide a discount API call to an online coupon service, the discount API call including the set of the at least one product criterion to identify a point reduction for at least a portion of the at least one product; and receive a return of discounted product metadata, the discounted product metadata corresponding to the point reduction for at least the portion of the at least one product.

20. A computer program product for fulfilling in-application product redemption requests, the computer program product being embodied in a non-transitory tangible computer readable storage medium and comprising computer instructions for:

receiving at a fulfillment system a product search application programming interface (API) call from an application on a client device, the product search API call including a set of at least one product criterion;

searching in an aggregated catalog of the fulfillment system based on the set of at least one product criteria and returning a set of product metadata, the set of product metadata corresponding to at least one product that matches the set of at least one product criteria, the aggregated catalog including information for a plurality of products from a plurality of online retail platforms separate from the fulfillment system, a first portion of the information for the plurality of products being received by the fulfillment system from the plurality of online retail platforms in response to a synchronization between the fulfillment system and the plurality of online retail platforms, a second portion of the information for the plurality of products being in a cache of the fulfillment system and not older than a most recent synchronization, the set of the product metadata including a requisite number of points for each of the at least one product, the requisite number of points being computed based on an actual price and a conversion rate corresponding to the application, the conversion rate including at least one of a fulfillment system cost for the application and a user cost for the application;

caching, at the fulfillment system, the second portion of the information for the plurality of products in the cache, the searching including searching the cache before searching the plurality of online retail platforms;

receiving, at the fulfillment system from the application, a redemption API call that includes product information and a physical address; and sending, from the fulfillment system, a fulfillment request to an online retail platform of the plurality of online retail platforms separate from the fulfillment system via a fulfillment API call that includes the product information and the physical address for the online retail platform to deliver a corresponding product to the physical address without requiring the application to communicate directly with the online retail platform.

* * * * *